(12) United States Patent
Nakamura et al.

(10) Patent No.: US 11,789,323 B2
(45) Date of Patent: Oct. 17, 2023

(54) LIQUID CRYSTAL DISPLAY DEVICE

(71) Applicant: TOPPAN INC., Tokyo (JP)

(72) Inventors: Yayoi Nakamura, Tokyo (JP); Kunpei Kobayashi, Tokyo (JP)

(73) Assignee: TOPPAN INC., Tokyo (JP)

(*) Notice: Subject to any disclaimer, the term of this patent is extended or adjusted under 35 U.S.C. 154(b) by 0 days.

(21) Appl. No.: 17/703,159

(22) Filed: Mar. 24, 2022

(65) Prior Publication Data
US 2022/0214585 A1    Jul. 7, 2022

Related U.S. Application Data

(63) Continuation of application No. PCT/JP2020/035538, filed on Sep. 18, 2020.

(30) Foreign Application Priority Data

Sep. 25, 2019 (JP) ................. 2019-174491

(51) Int. Cl.
*G02F 1/1343* (2006.01)
*G02F 1/1368* (2006.01)
(Continued)

(52) U.S. Cl.
CPC ...... *G02F 1/134372* (2021.01); *G02F 1/1368* (2013.01); *G02F 1/13439* (2013.01);
(Continued)

(58) Field of Classification Search
CPC ............ G02F 1/1333; G02F 1/133345; G02F 1/1335; G02F 1/133514; G02F 1/133512;
(Continued)

(56) References Cited

U.S. PATENT DOCUMENTS 8,711,311 B2    4/2014 Kaneko et al.
2007/0229749 A1 10/2007 Kaneko et al.
(Continued)

FOREIGN PATENT DOCUMENTS

JP    4238877 B2    3/2009
JP    4449958 B2    2/2010
(Continued)

OTHER PUBLICATIONS

Written Opinion (Form PCT/ISA/237); Nov. 2, 2020 in corresponding PCT Application No. PCT/JP2020/035538 (7 pages) (7 pages English Translation).
(Continued)

*Primary Examiner* — Thoi V Duong

(57) ABSTRACT

A liquid crystal display device includes: first and second substrates; a liquid crystal layer interposed between the first and second substrates; a switching element provided on the first substrate; a first pixel electrode provided on the first substrate and electrically connected to a drain electrode of the switching element; an insulating film provided on the first pixel electrode; and a common electrode provided on the insulating film and including a first slit. The first pixel electrode extends in a first direction. The first slit extends in the first direction and is located above the first pixel electrode. In a planar view, both edges of the first pixel electrode in a second direction intersecting the first direction are located inside the first slit.

10 Claims, 20 Drawing Sheets

(51) Int. Cl.
| | |
|---|---|
| *G02F 1/137* | (2006.01) |
| *G02F 1/1337* | (2006.01) |
| *G02F 1/1333* | (2006.01) |
| *G02F 1/1362* | (2006.01) |
| *G02F 1/1335* | (2006.01) |

(52) U.S. Cl.
CPC .... *G02F 1/13706* (2021.01); *G02F 1/133345* (2013.01); *G02F 1/133738* (2021.01); *G02F 1/134309* (2013.01); *G02F 1/134318* (2021.01); *G02F 1/136286* (2013.01); *G02F 1/133514* (2013.01)

(58) Field of Classification Search
CPC ......... G02F 1/133707; G02F 1/133738; G02F 1/1343; G02F 1/134309; G02F 1/134318; G02F 1/134363; G02F 1/134372; G02F 1/134381; G02F 1/13439; G02F 1/1362; G02F 1/136209
See application file for complete search history.

(56) References Cited

U.S. PATENT DOCUMENTS

| | | | | |
|---|---|---|---|---|
| 2015/0234245 A1* | 8/2015 | Ito | ................... | G02F 1/134363 349/143 |
| 2015/0346564 A1 | 12/2015 | Moriwaki et al. | | |
| 2016/0170263 A1* | 6/2016 | Arai | .................. | G02F 1/134309 349/33 |
| 2018/0252974 A1* | 9/2018 | Okita | ................ | G02F 1/136286 |

FOREIGN PATENT DOCUMENTS

| | | |
|---|---|---|
| JP | 2010-152348 A | 7/2010 |
| JP | 2017-156515 A | 9/2017 |
| JP | 2018-146694 A | 9/2018 |
| WO | WO 2014/103911 A1 | 7/2014 |

OTHER PUBLICATIONS

Notification of Transmittal of the International Preliminary Report on Patentability (Form PCT/IB/338); dated Apr. 7, 2022 in corresponding PCT Application No. PCT/JP2020/035538 (1 page).
International Preliminary Report on Patentability (Form PCT/IB/373); dated Mar. 15, 2022 in corresponding PCT Application No. PCT/JP2020/035538 (1 page).
International Search Report (Form PCT/ISA/210; dated Nov. 2, 2020 in corresponding PCT Application No. PCT/JP2020/035538 (3 pages) (2 pages English Translation).
Written Opinion (Form PCT/ISA/237); Nov. 2, 2020 in corresponding PCT Application No. PCT/JP2020/035538 (7 pages).
Chinese Office Action issued in corresponding Chinese Application No. 202080067576.3 dated Mar. 31, 2023.

* cited by examiner

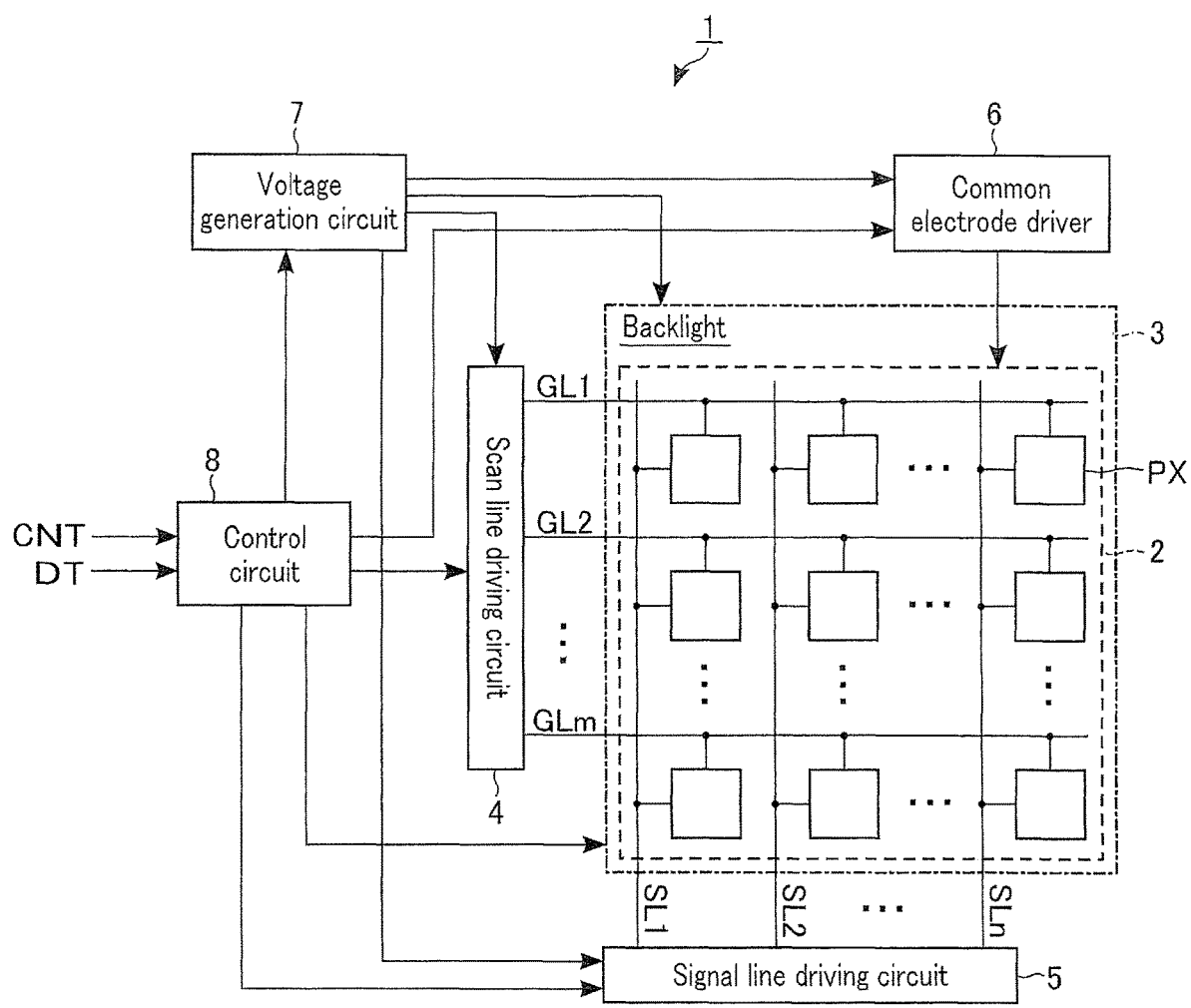
F I G. 1

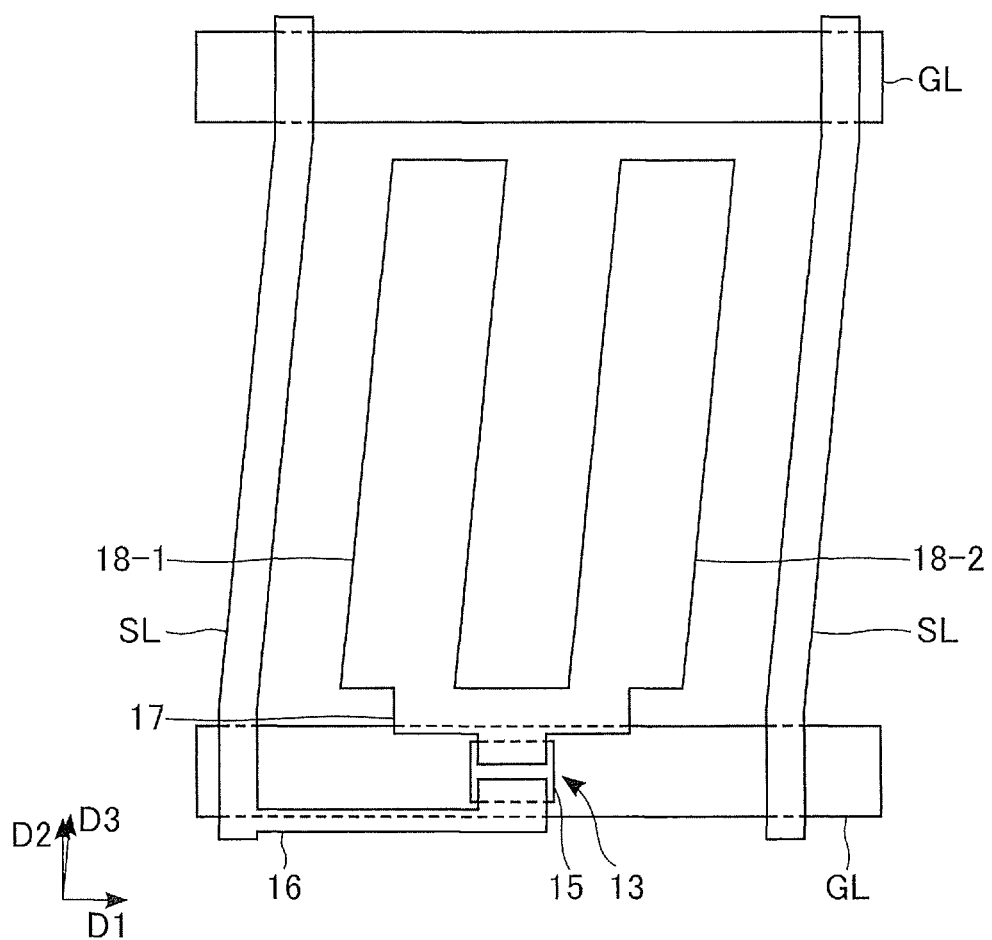
F I G. 12

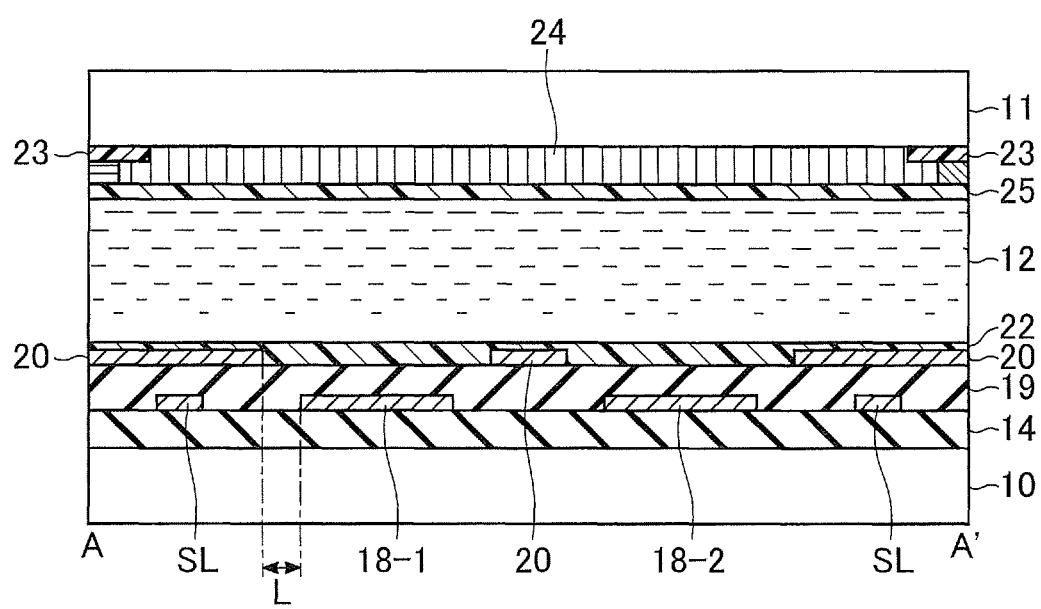
F I G. 14

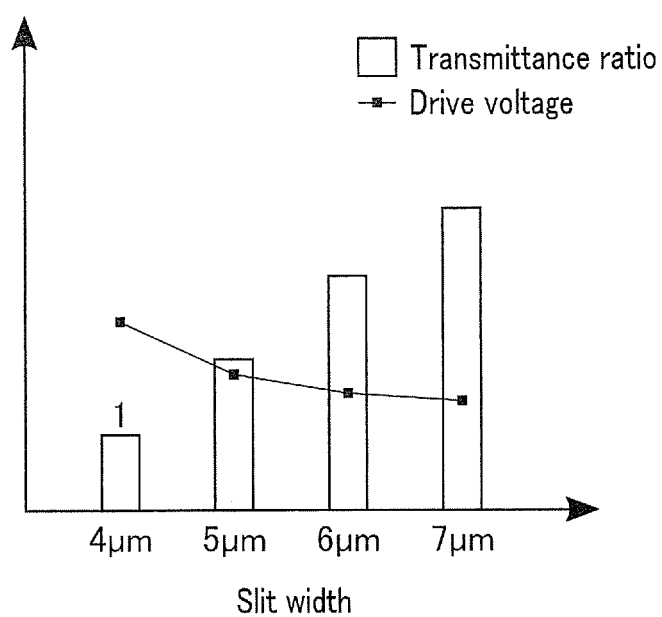
F I G. 15

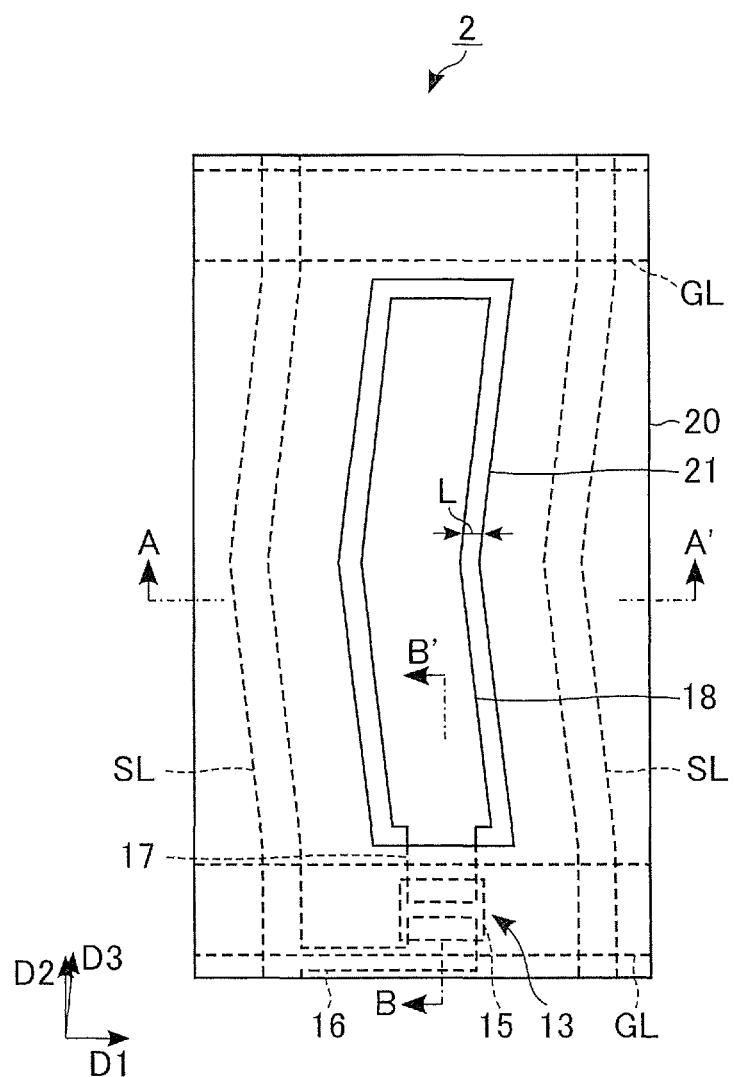
F I G. 16

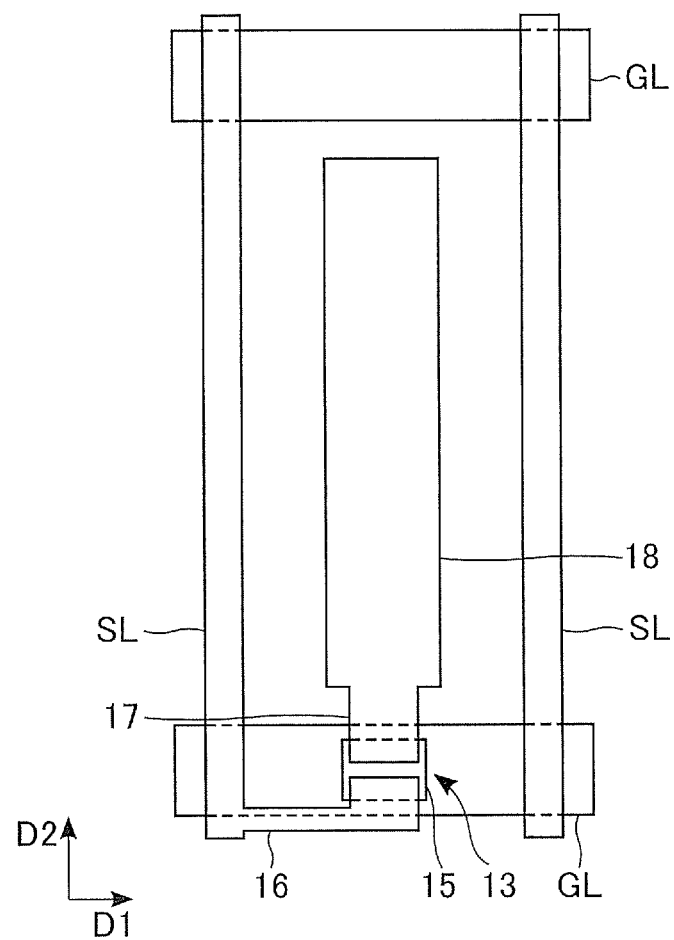
F I G. 20

LIQUID CRYSTAL DISPLAY DEVICE

CROSS-REFERENCE TO RELATED APPLICATIONS

This application is a Continuation Application of PCT Application No. PCT/JP2020/035538, filed Sep. 18, 2020, and based upon and claiming the benefit of priority from Japanese Patent Application No. 2019-174491, filed Sep. 25, 2019, the entire contents of all of which are incorporated herein by reference.

FIELD

The present invention relates to a liquid crystal display device.

BACKGROUND

A fringe field switching (FFS) liquid crystal display device which controls liquid crystal in a fringe electric field is known. The liquid crystal display device includes a first transparent substrate having a thin film transistor (TFT), a second transparent substrate having a color filter and a liquid crystal layer interposed between the first and second transparent substrates. The first transparent substrate is provided with, for example, a pixel electrode, and a common electrode is provided above the pixel electrode with an insulating film therebetween. The common electrode includes a plurality of slits for each pixel area. The pixel electrode has an area covering the slits formed in the common electrode. A lateral electric field is applied between the common electrode and the pixel electrode to control the alignment of the liquid crystal layer.

The slits are formed in a line-and-space pattern. The number of slits that can be formed in one pixel is limited by the pixel pitch. In a high-definition liquid crystal display device whose pixel pitch is small, the number of slits that can be formed in one pixel is reduced. In this case, it is difficult to obtain a desired transmittance.

SUMMARY

According to an aspect of the present invention, there is provided a liquid crystal display device comprising:
first and second substrates;
a liquid crystal layer interposed between the first and second substrates;
a switching element provided on the first substrate;
a first pixel electrode provided on the first substrate and electrically connected to a drain electrode of the switching element;
an insulating film provided on the first pixel electrode; and
a common electrode provided on the insulating film and including a first slit,
wherein the first pixel electrode extends in a first direction,
the first slit extends in the first direction and is located above the first pixel electrode, and
in a planar view, both edges of the first pixel electrode in a second direction intersecting the first direction are located inside the first slit.

BRIEF DESCRIPTION OF THE DRAWINGS

FIG. 1 is a block diagram of a liquid crystal display device according to a first embodiment.
FIG. 12 is a plan view illustrating a configuration of part of the liquid crystal display panel which is below a common electrode.
FIG. 14 is a sectional view of the liquid crystal display panel taken along line A-A' of FIG. 11.
FIG. 15 is a graph illustrating a drive voltage and transmittance with respect to the slit width.
FIG. 16 is a plan view of a liquid crystal display panel according to a second embodiment.
FIG. 20 is a plan view illustrating a configuration of part of the liquid crystal display panel which is below a common electrode.

DETAILED DESCRIPTION

Figure 2:
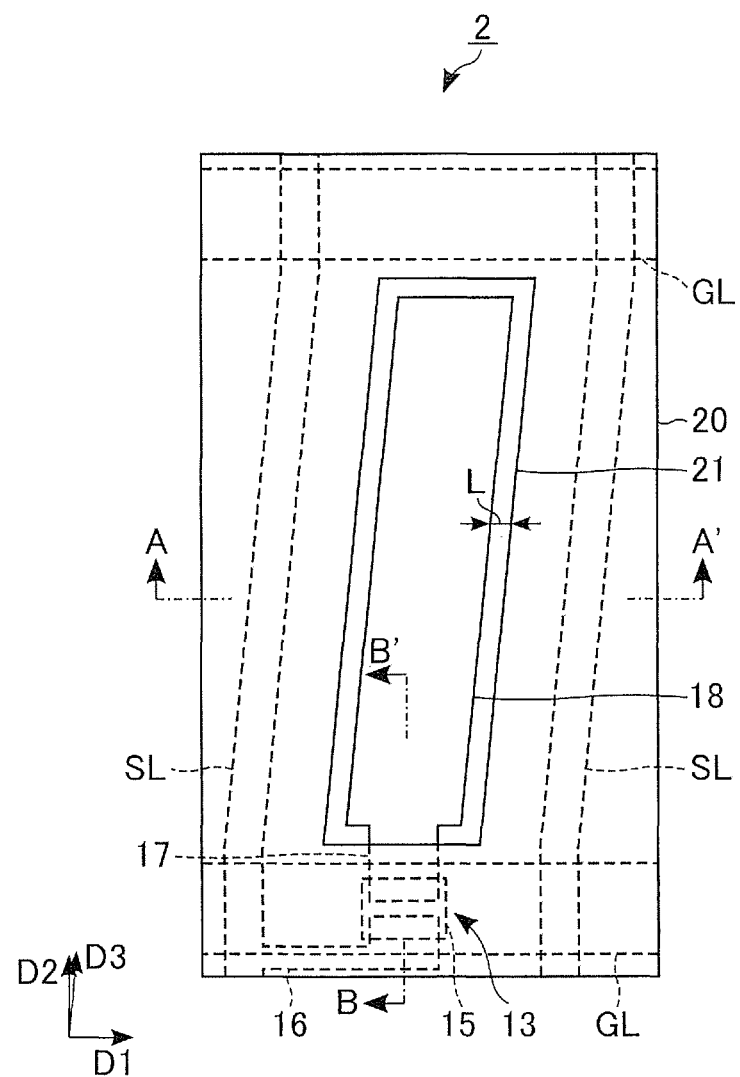
FIG. 2 is a plan view of the liquid crystal display panel according to the first embodiment.

Embodiments will be described below with reference to the drawings. The drawings are schematic or conceptual, and the dimension, ratio, or the like in each of the drawings is not necessarily the same as the actual one. The drawings may include portions that differ in the relationship in dimensions and in the ratio even though the portions are the same. Some of the embodiments exemplify a device and a method for embodying the technical concept of the present invention, and the technical concept is not specified by the shape, configuration, placement, etc. of the components. In the following descriptions, the elements having the same function and configuration are denoted by the same sign and their descriptions will be repeated only when necessary.

[1] First Embodiment

[1-1] Overall Configuration of Liquid Crystal Display Device

The liquid crystal display device according to the present embodiments is a fringe field switching (FFS) liquid crystal display device. The FFS is a system in which homogeneously aligned liquid crystal is switched by a fringe electric field.

FIG. 1 is a block diagram of a liquid crystal display device 1 according to a first embodiment of the present invention. The liquid crystal display device 1 includes a liquid crystal display panel 2, a backlight (illumination device) 3, a scan line driving circuit 4, a signal line driving circuit 5, a common electrode driver 6, a voltage generation circuit 7 and a control circuit 8.

The liquid crystal display panel 2 includes a pixel array in which a plurality of pixels PX are arranged in a matrix. The liquid crystal display panel 2 includes a plurality of scan lines GL1 to GLm each extending in the row direction and a plurality of signal lines SL1 to SLn each extending in the column direction. The letters "m" and "n" each indicate an integer of two or more. Pixels PX are located in intersection areas between the scan and signal lines GL and SL.

The backlight 3 is a surface light source that irradiates the back surface of the liquid crystal display panel 2 with light. As the backlight 3, for example, a direct type or a side light (edge light) type LED backlight is used.

The scan line driving circuit 4 is electrically connected to the scan lines GL. Based on a control signal supplied from the control circuit 8, the scan line driving circuit 4 sends a scan signal to the liquid crystal display panel 2 to turn on/off the switching elements included in the pixels PX.

The signal line driving circuit 5 is electrically connected to the signal lines SL. The signal line driving circuit 5 receives a control signal and display data from the control circuit 8. Based on the control signal, the signal line driving circuit 5 sends a gradation signal (drive voltage) corresponding to the display data to the liquid crystal display panel 2.

The common electrode driver 6 generates a common voltage Vcom and applies it to the common electrode in the liquid crystal display panel 2. The voltage generation circuit 7 generates various voltages necessary for the operation of the liquid crystal display device 1 and applies them to the respective circuits.

The control circuit 8 collectively controls the operation of the liquid crystal display device 1. The control circuit 8 externally receives image data DT and control signal CNT. Based on the image data DT, the control circuit 8 generates various control signals and sends the control signals to each of the circuits.

[1-2] Configuration of Liquid Crystal Display Panel 2

Figure 3:
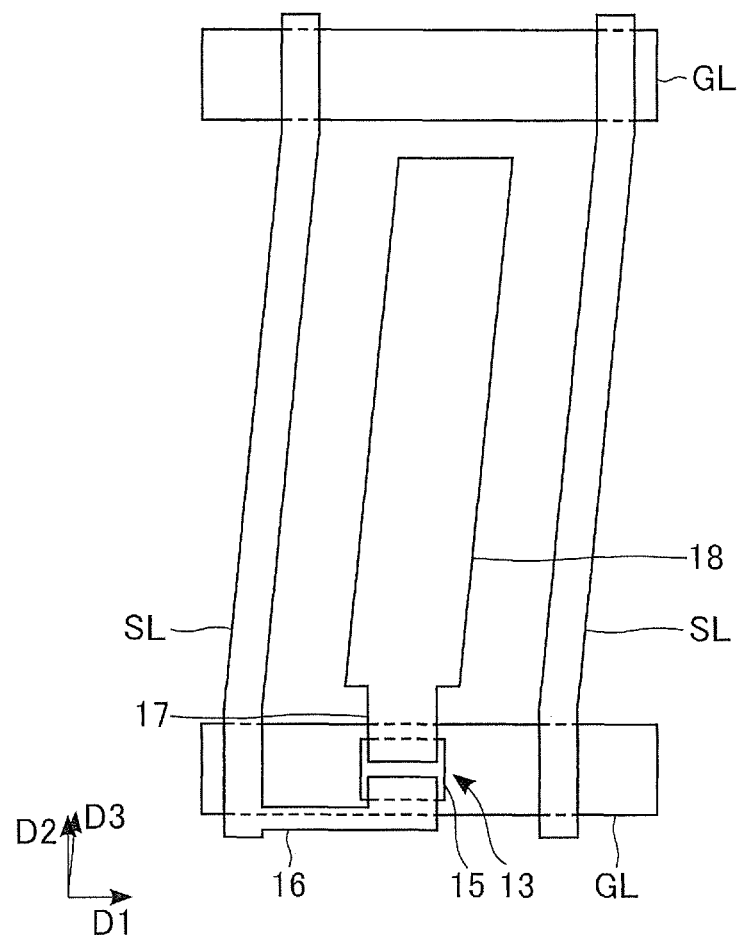
FIG. 3 is a plan view illustrating a configuration of part of the liquid crystal display panel which is below a common electrode.
Figure 4:
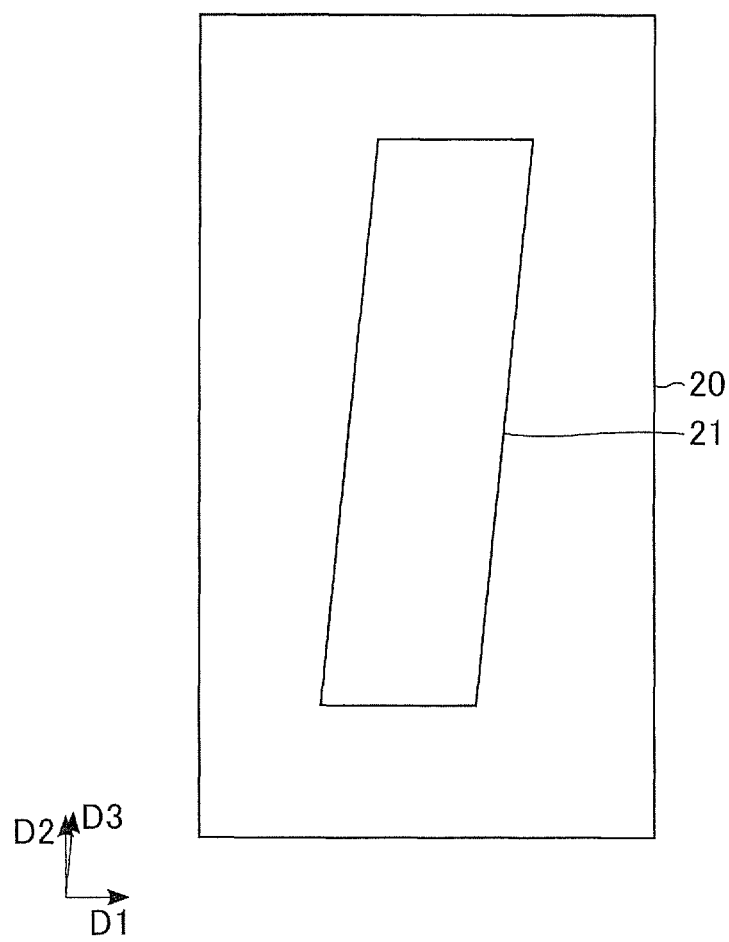
FIG. 4 is a plan view of the common electrode that is extracted.
Figure 5:
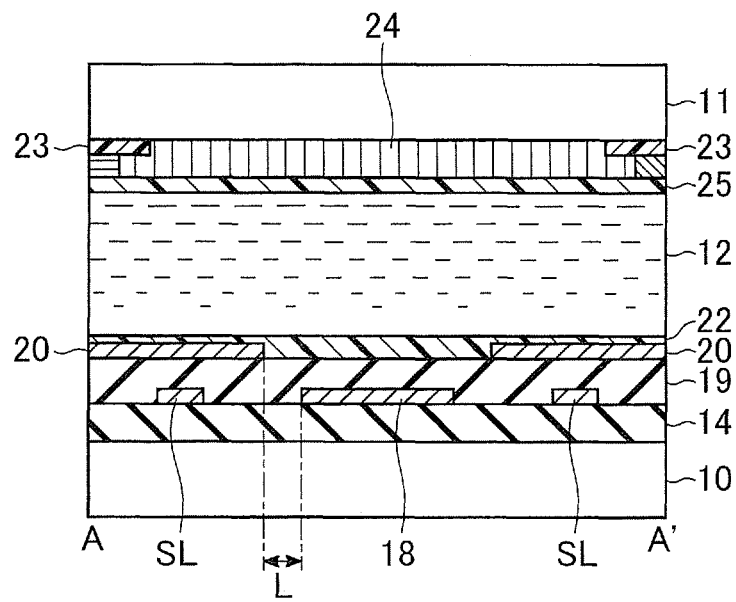
FIG. 5 is a sectional view of the liquid crystal display panel taken along line A-A' of FIG. 2.
Figure 6:
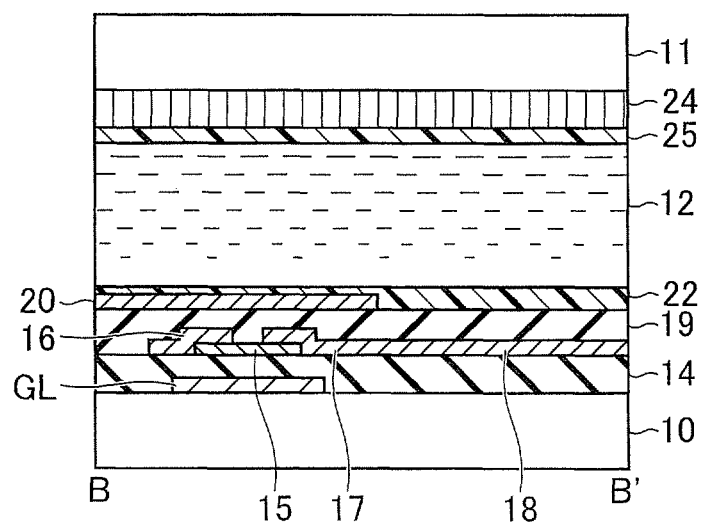
FIG. 6 is a sectional view of the liquid crystal display panel taken along line B-B' of FIG. 2.

FIG. 2 is a plan view of the liquid crystal display panel 2 according to the first embodiment. FIG. 3 is a plan view illustrating the configuration of part of the liquid crystal display panel 2 which is below the common electrode 20. FIG. 4 is a plan view of the common electrode 20 that is extracted. FIG. 5 is a sectional view of the liquid crystal display panel 2 taken along line A-A' in FIG. 2. FIG. 6 is a sectional view of the liquid crystal display panel 2 taken along line B-B' in FIG. 2. In FIG. 2, a portion corresponding to one pixel is extracted and actually, a plurality of pixels each corresponding to the pixel shown in FIG. 2 are arranged in a matrix.

The liquid crystal display panel 2 includes a TFT substrate 10 on which a switching element (TFT), a pixel electrode and the like are formed, and a color filter substrate (CF substrate) 11 on which a color filter and the like are formed and which is opposed to the TFT substrate 10. Each of the TFT substrate 10 and CF substrate 11 is configured by a transparent substrate (for example, a glass substrate or a plastic substrate).

The liquid crystal layer 12 is filled between the TFT substrate 10 and the CF substrate 11. Specifically, the liquid crystal layer 12 is sealed in a display area surrounded by the TFT substrate 10, the CF substrates 11 and a sealing member (not shown). The sealing member is made of an ultraviolet-curing resin, a thermosetting resin, an ultraviolet-heat combination-type curing resin, or the like, and is applied to the TFT substrate 10 or the CF substrate 11 in the manufacturing process and then cured by ultraviolet irradiation, heating, or the like.

The liquid crystal materials of the liquid crystal layer 12 vary in optical characteristics as the alignment of liquid crystal molecules is manipulated in accordance with an applied electric field. In the present embodiment, a positive (P-type) nematic liquid crystal having positive dielectric anisotropy is used as the liquid crystal layer 12. The liquid crystal layer 12 is horizontally aligned (homogeneous alignment) in an initial state. When no voltage (no electric field) is applied, the liquid crystal molecules are aligned substantially horizontally with respect to the main surface of the substrate. When a voltage (electric field) is applied, the director of the liquid crystal molecules tilt toward the direction of the electric field.

First is a description of the configuration alongside the TFT substrate 10. A switching element 13 is provided on the liquid crystal layer 12 side of the TFT substrate 10 for each pixel. As the switching element 13, for example, a thin film transistor (TFT) and an n-channel TFT are used. As will be described later, the TFT 13 includes a gate electrode functioning as a scan line, a gate insulating film provided on the gate electrode, a semiconductor layer provided on the gate insulating film, and a source electrode and a drain electrode which are provided on the semiconductor layer so as to be spaced from each other.

A gate electrode GL is provided on the TFT substrate 10 to extend in a first direction D1. The gate electrode GL functions as a scan line GL. A plurality of pixels of one row arranged in the first direction D1 are connected in common to one scan line GL. A gate insulating film 14 is provided on the TFT substrate 10 and the gate electrode GL.

On the gate insulating film 14, a semiconductor layer 15 is provided for each pixel. For example, amorphous silicon is used as the semiconductor layer 15.

On the semiconductor layer 15 and the gate insulating film 14, a source electrode 16 and a drain electrode 17 are provided so as to be spaced from each other in a second direction D2 (which is orthogonal to the first direction D1). The source electrode 16 and drain electrode 17 overlap the semiconductor layer 15. In order to improve electrical connection between the source electrode 16 and the semiconductor layer 15, an n+-type semiconductor layer into which high-concentration n-type impurities are introduced may be provided between them. Similarly, an n+-type semiconductor layer may be provided between the drain electrode 17 and the semiconductor layer 15.

A pixel electrode 18 is provided on the gate insulating film 14 to extend in a third direction D3. The third direction D3 is an oblique direction which is inclined 5° to 10° toward the second direction D2. The planar shape of the pixel electrode 18 is, for example, a parallelogram. The pixel electrode 18 is electrically connected to the drain electrode 17.

Signal lines SL are each provided on the gate insulating film 14 to extend in the second direction D2. For example, a portion of each signal line SL, which is adjacent to the pixel electrode 18, extends in the third direction. Each signal line SL is placed at a boundary between adjacent two pixels in the first direction D1. A plurality of pixels for one column arranged in the second direction D2 are connected in common to one signal line SL. The source electrode 16 is electrically connected to the signal line SL.

An insulating film 19 is provided on the source electrode 16, drain electrode 17, pixel electrode 18, signal lines SL and gate insulating film 14.

A common electrode 20 is provided on the insulating film 19. The common electrode 20 is provided in common to a plurality of pixels. The common electrode 20 has a slit 21 for each pixel. The slit 21 extends in the third direction D3 like the pixel electrode 18. The planar shape of the slit 21 is, for example, a parallelogram.

The slit 21 is placed above the pixel electrode 18. In planar view, the edges of the pixel electrode 18 corresponding to the four sides thereof are located inside the slit 21. The planar view is viewing a pixel from above the substrate. In planar view, the edges of the pixel electrode 18 and the slit 21 are located with a distance L therebetween. The distance L is, for example, 1 μm to 2 μm.

An alignment film 22 is provided on the common electrode 20 and the insulating film 19 to control the alignment of the liquid crystal layer 12. The alignment film 22 aligns the liquid crystal molecules horizontally in the initial state of the liquid crystal layer 12. The alignment film 22 is rubbed such that the major axes of the liquid crystal molecules are aligned in the second direction D2.

Next is a description of the configuration alongside the CF substrate 10. A black matrix 23 for light shielding (also known as a black mask and a light shielding film) is provided on the liquid crystal layer 12 side of the CF substrate 11. The black matrix 23 is placed at a boundary between pixels and formed into a mesh. The black matrix 23 has a function of shielding the TFT 13 from light and a function of blocking unnecessary light between color filters of different colors to improve contrast.

A plurality of color filters 24 are provided on the CF substrate 11 and the black matrix 23. The color filters (color members) 24 include a plurality of red filters, a plurality of green filters and a plurality of blue filters. A general color filter is composed of three primary colors of light, namely red (R), green (G) and blue (B). A set of adjacent three colors of R, G and B is a display unit (pixel), and a monochromatic part of any one of R, G and B in one pixel is a minimum driving unit called a sub-pixel. The TFT 13 and the pixel electrode 18 are provided for each sub-pixel. In the descriptions of the present specification, the sub-pixel will be referred to as a pixel unless it is particularly necessary to distinguish a sub-pixel from a pixel. As the array of the color filters, an optional array including a stripe array, a mosaic array and a delta array can be applied. In the present embodiment, a pixel of the red filter is exemplified.

An alignment film 25 is provided on the color filter 24 and the black matrix 23 to control the alignment of the liquid crystal layer 12. The alignment film 25 horizontally aligns liquid crystal molecules in the initial state of the liquid crystal layer 12. In addition, the alignment film 25 is rubbed such that the major axes of the liquid crystal molecules are aligned in the second direction D2.

Although not shown, a first polarizing plate is stacked on the TFT substrate 10 opposite to the liquid crystal layer 12, and a second polarizing plate is stacked on the CF substrate 11 opposite to the liquid crystal layer 12. The first and second polarizing plates are placed such that their transmission axes are orthogonal to each other, that is, in a crossed nicols state.

(Examples of Materials)

As the gate electrode GL, source electrode 16, drain electrode 17 and signal lines SL, for example, any one of aluminum (Al), molybdenum (Mo), chromium (Cr) and tungsten (W), or an alloy containing one or more of these is used.

The pixel electrode 18 and the common electrode 20 are formed of a transparent electrode, and indium tin oxide (ITO), for example, is used. The gate insulating film 14 and the insulating film 19 are formed of a transparent insulating material, such as silicon nitride (SiN).

[1-3] Alignment of Liquid Crystal Layer

Figure 7:
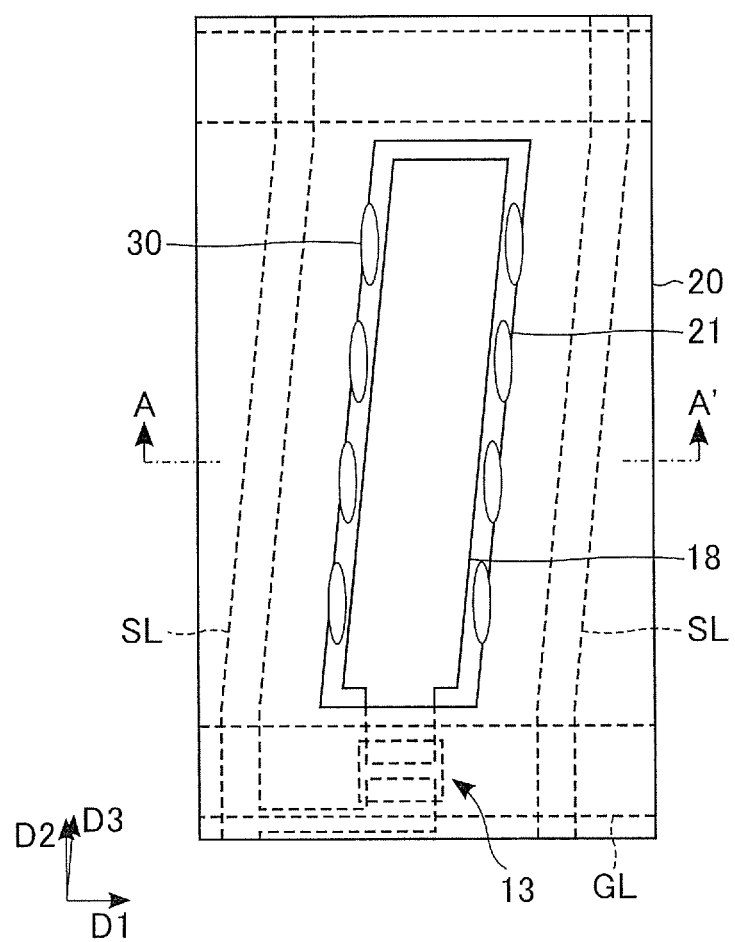
FIG. 7 is a plan view of the liquid crystal display panel in an off state.
Figure 8:
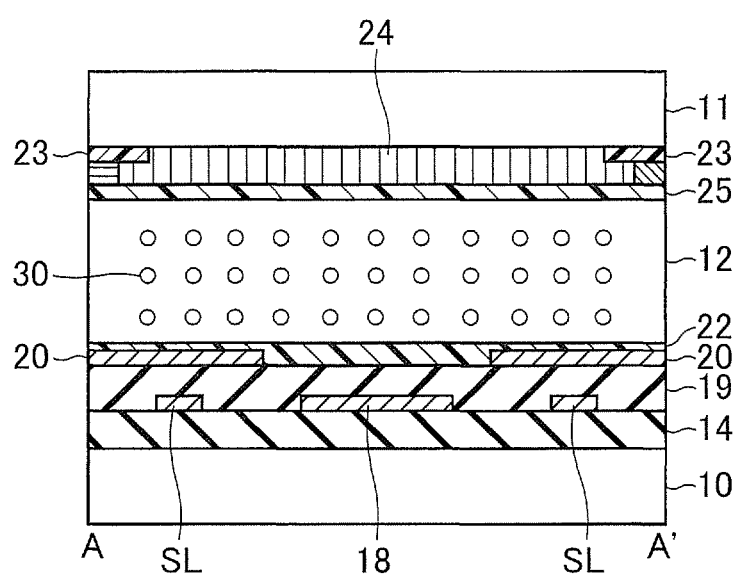
FIG. 8 is a sectional view of the liquid crystal display panel in the off state.
Figure 9:
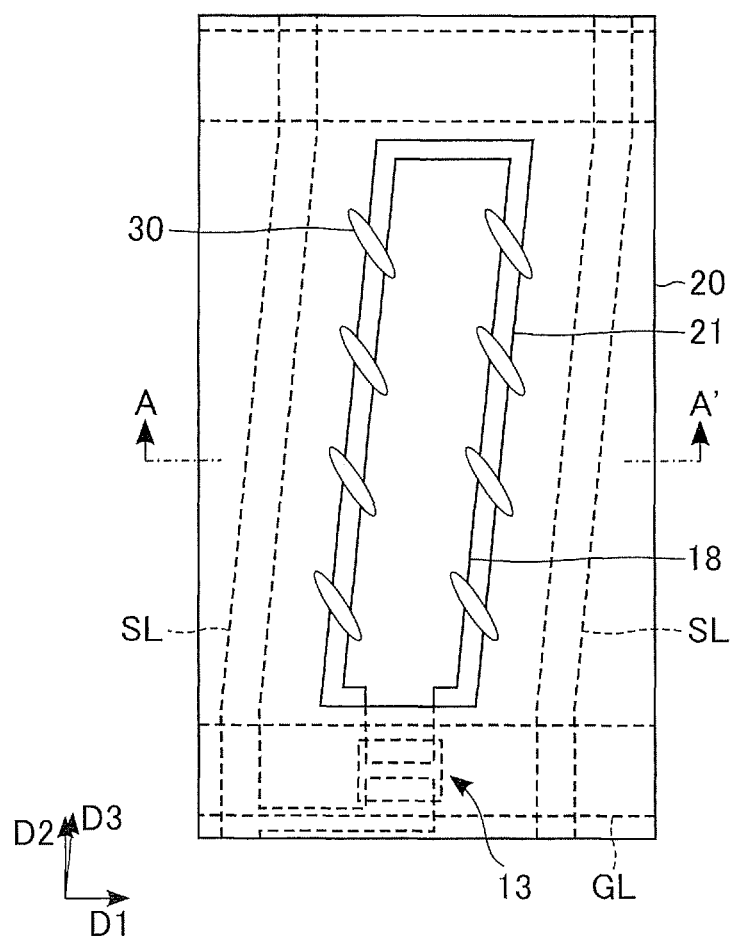
FIG. 9 is a plan view of the liquid crystal display panel in an on state.
Figure 10:
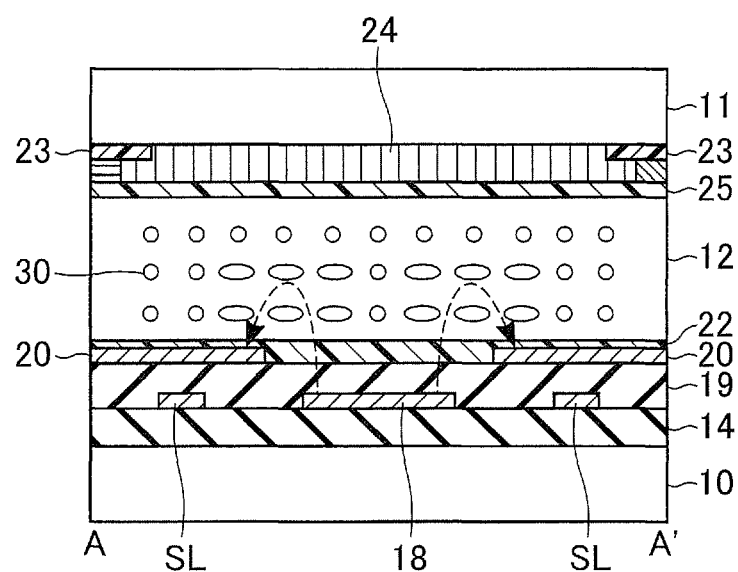
FIG. 10 is a sectional view of the liquid crystal display panel in the on state.

Next is a description of the alignment of the liquid crystal layer. FIG. 7 is a plan view of the liquid crystal display panel 2 in an off state. FIG. 8 is a sectional view of the liquid crystal display panel 2 in the off state. FIG. 9 is a plan view of the liquid crystal display panel 2 in an on state. FIG. 10 is a sectional view of the liquid crystal display panel 2 in the on state. FIGS. 7 to 10 schematically show liquid crystal molecules 30.

The common electrode driver 6A applies a common voltage Vcom to the common electrode 20. The common voltage Vcom is, for example, 0 V. In the off state, no electric field is applied to the liquid crystal layer 12, and the same common voltage Vcom as that of the common electrode 20 is applied to the pixel electrode 18. In the on state, an electric field is applied to the liquid crystal layer 12, and a positive voltage is applied to the pixel electrode 18. Actually, reverse driving (AC driving) is performed to reverse the polarity of an electric field between the pixel electrode 18 and the common electrode 20 at a predetermined period. The reverse driving can prevent liquid crystal from being degraded, for example. The period of the reverse driving can optionally be set.

In the off state, the liquid crystal molecules 30 are set in the initial state, that is, the major axes of the liquid crystal molecules 30 are aligned in the first direction D1. The first direction D1 is the same as the rubbing direction of the alignment films 22 and 25.

In the on state, an electric field, which is directed from the common electrode 20 to the pixel electrode 18, is applied to the liquid crystal layer 12. The dashed arrows in FIG. 10 represent the electric field. In a planar view, the liquid crystal molecules 30 rotate in a direction inclined toward the first direction D1. The liquid crystal display panel 2 can thus control the amount of transmission of incident light. That is, the transmittance of the liquid crystal display panel 2 can be changed.

[1-4] Modification

The number of pixel electrodes included in a pixel may be two or more. The modification is an example of the configuration of the liquid crystal display panel 2 including two pixel electrodes for each pixel.

Figure 11:
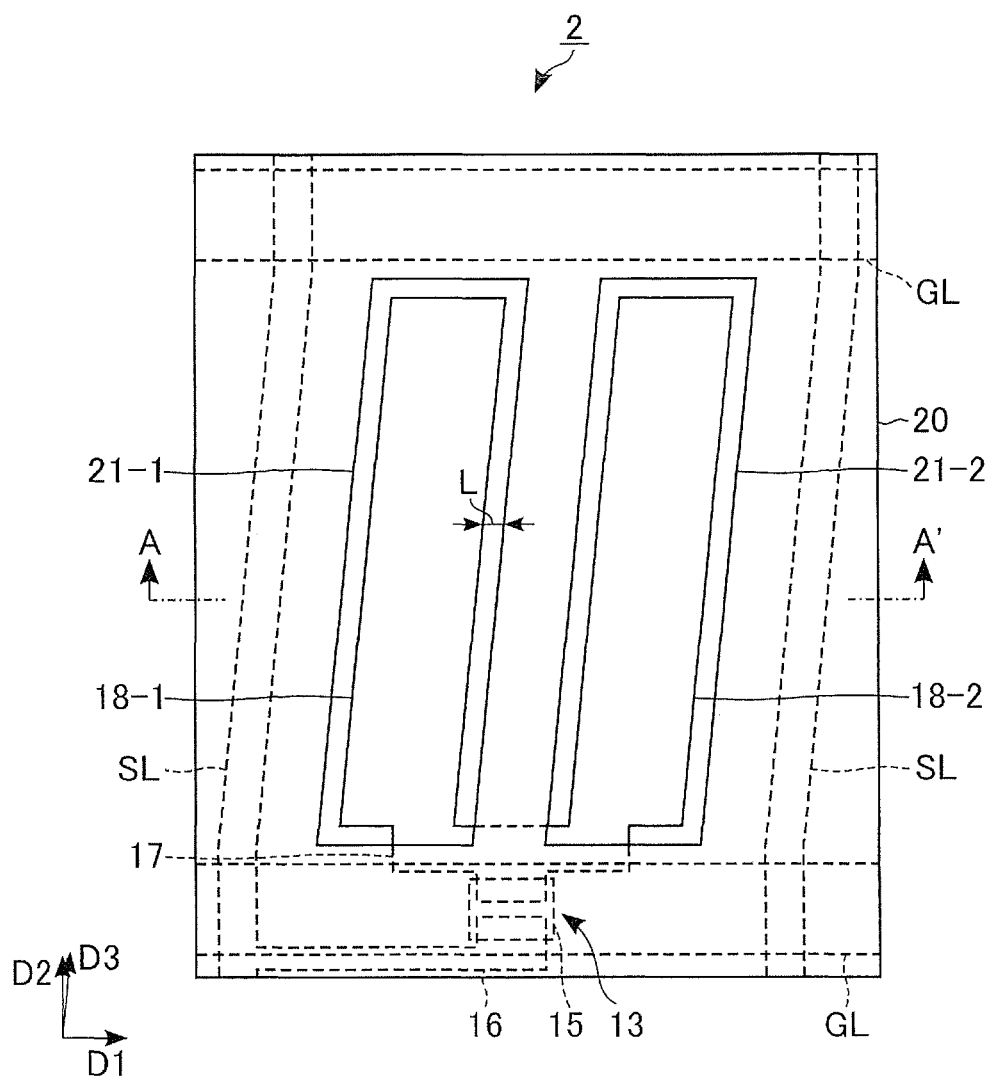
FIG. 11 is a plan view of a liquid crystal display panel according to a modification.
Figure 13:
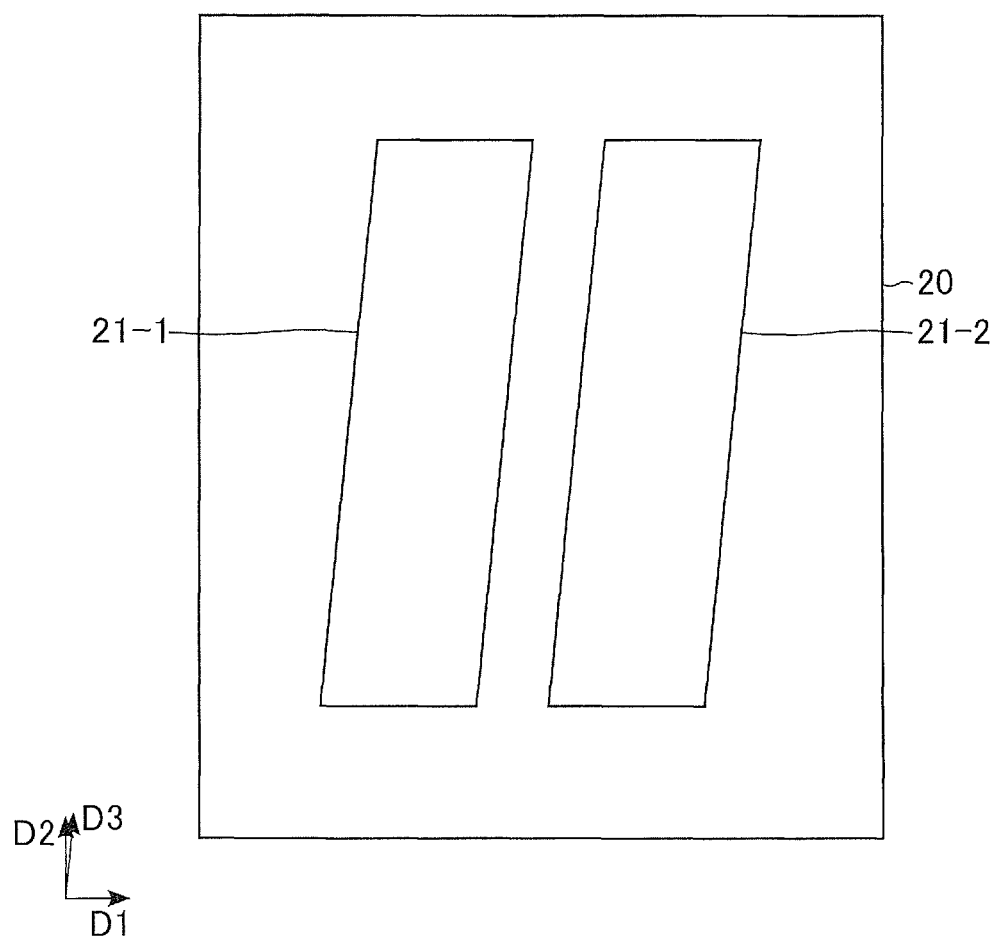
FIG. 13 is a plan view of the common electrode that is extracted.

FIG. 11 is a plan view of the liquid crystal display panel 2 according to the modification. FIG. 12 is a plan view illustrating part of the liquid crystal display panel 2 which is below the common electrode 20. FIG. 13 is a plan view of the common electrode 20 that is extracted. FIG. 14 is a sectional view of the liquid crystal display panel 2 taken along line A-A' of FIG. 11. Note that the sectional structure of the TFT 13 and its periphery is the same as that in FIG. 6.

A first pixel electrode 18-1 and a second pixel electrode 18-2, which extend in the third direction D3, are provided on the gate insulating film 14. The first and second pixel electrodes 18-1 and 18-2 are placed adjacent to each other in the first direction D1. The planar shapes of the first and second pixel electrodes 18-1 and 18-2 are, for example, parallelograms.

The first and second pixel electrodes 18-1 and 18-2 are electrically connected to each other and also electrically connected to the drain electrode 17.

The common electrode 20 is provided on the insulating film 19. The common electrode 20 has a first slit 21-1 and a second slit 21-2 for each pixel. The first and second slits 21-1 and 21-2 extend in the third direction D3 and are arranged adjacent to each other in the first direction D1. The planar shapes of the first and second slits 21-1 and 21-2 are, for example, parallelograms.

The first slit 21-1 is located above the first pixel electrode 18-1. In a planar view, the edges corresponding to the four sides of the first pixel electrode 18-1 are located inside the first slit 21-1. In a planar view, the edges of the first pixel electrode 18-1 and the first slit 21-1 are located with a distance L therebetween.

The second slit 21-2 is located above the second pixel electrode 18-2. In a planar view, the edges corresponding to the four sides of the second pixel electrode 18-2 are located inside the second slit 21-2. In a planar view, the edges of the second pixel electrode 18-2 and the second slit 21-2 are located with a distance L therebetween.

In the present modification, the number of areas capable of controlling the alignment of the liquid crystal layer can be increased.

[1-5] Advantageous Effects of First Embodiment

As described in detail above, in the first embodiment, the liquid crystal display device 1 includes a TFT substrate 10, a CF substrate 11, a liquid crystal layer 12 interposed between the TFT substrate 10 and the CF substrate 11, a switching element 13 provided on the TFT substrate 10, a pixel electrode 18 provided on the TFT substrate 10 and electrically connected to the drain electrode of the switching element 13, an insulating film 19 provided on the pixel electrode 18, and a common electrode 20 provided on the insulating film 19 and having a slit 21. The pixel electrode 18 extends in the third direction D3. The slit 21 extends in the third direction D3 and is located above the pixel electrode 18. In a planar view, both edges of the pixel electrode 18 in the first direction D1 are located inside the slit 21.

According to the first embodiment, therefore, the alignment of liquid crystal molecules can be controlled on both sides of the pixel electrode 18 in the first direction D1. Thus, the transmittance can be improved.

The alignment of liquid crystal molecules in two areas can be controlled using one pixel electrode 18 and one slit 21. The transmittance can thus be obtained with efficiency in a high-definition pixel whose pixel pitch is small.

Since, furthermore, the alignment of the liquid crystal layer can be controlled using one pixel electrode 18 and one slit 21, the pixels can be miniaturized.

In a planar view, the pixel electrode 18 and the common electrode 20 do not overlap each other. Thus, the vertical electric field perpendicular to the main surface of the substrate can be lowered with the increase of the horizontal electric field that is parallel to the main surface of the substrate. Since, therefore, the liquid crystal molecules are easily uniaxially aligned, the transmittance can be prevented from lowering.

FIG. 15 is a graph illustrating a drive voltage and transmittance with respect to the slit width. The slit width is the length of the slit 21 in the first direction D1. FIG. 15 shows numerical values of four slit widths of 4 μm, 5 μm, 6 μm and 7 μm. In FIG. 15, the bar graph represents a transmittance ratio and the line graph represents a drive voltage. In FIG. 15, the transmittance of 4 μm in slit width is set to 1.

As shown in FIG. 15, the larger the slit width, the higher the transmittance. The larger the slit width, the lower the drive voltage. In the present embodiment, useless vertical electric field can be decreased and thus the drive voltage can be lowered.

[2] Second Embodiment

The second embodiment is directed to an example of a configuration in which the pixel electrode is shaped like a dogleg.

Figure 17:
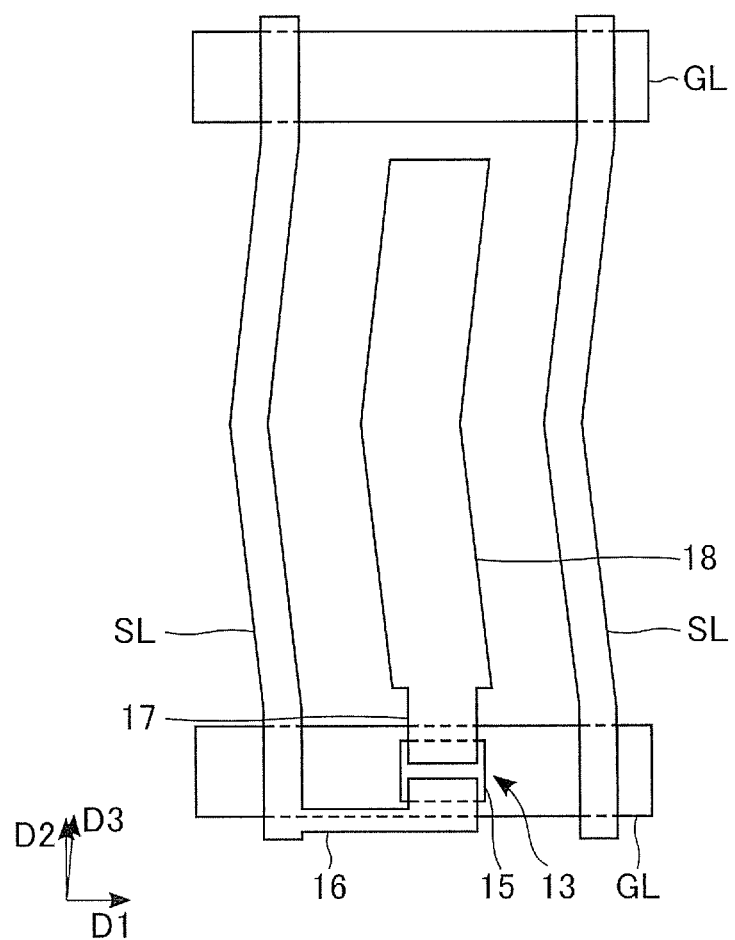
FIG. 17 is a plan view illustrating a configuration of part of the liquid crystal display panel which is below a common electrode.
Figure 18:
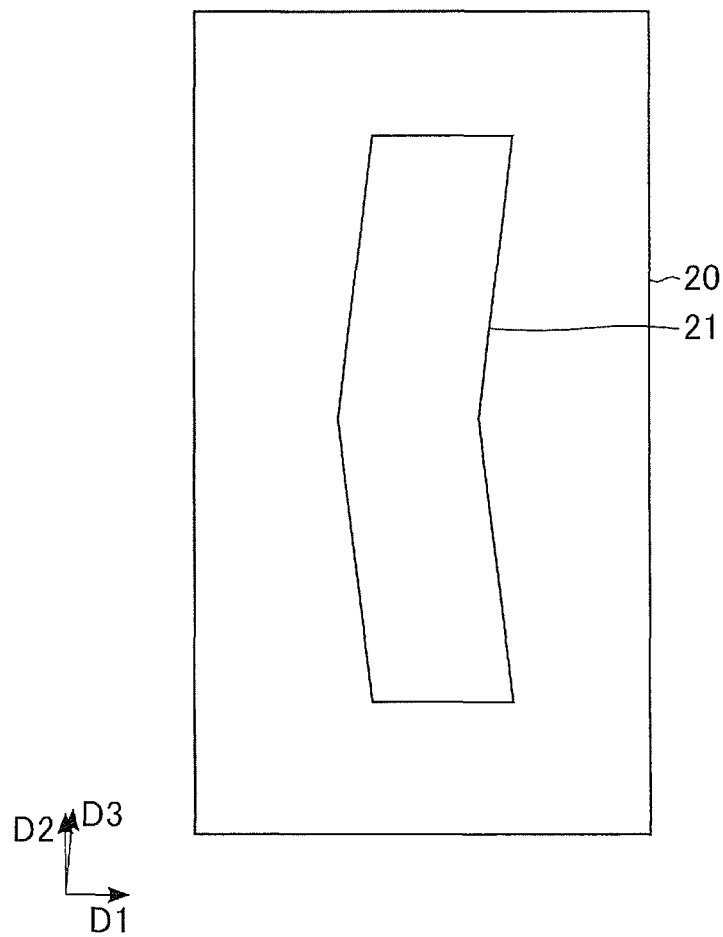
FIG. 18 is a plan view of the common electrode that is extracted.

FIG. 16 is a plan view of a liquid crystal display panel 2 according to a second embodiment. FIG. 17 is a plan view illustrating a configuration of part of the liquid crystal display panel 2 which is below a common electrode. FIG. 18 is a plan view of the common electrode 20 that is extracted. The sectional view of the liquid crystal display panel 2 along the line A-A' in FIG. 16 is the same as that in FIG. 5 described in the first embodiment. The sectional view of the liquid crystal display panel 2 along the line B-B' in FIG. 16 is the same as that in FIG. 6 described in the first embodiment.

The pixel electrode 18 extends in the second direction D2 and is shaped like a dogleg. In other words, the pixel electrode 18 includes an electrode portion extending in the third direction D3 and an electrode portion extending in an oblique direction which is linearly symmetrical with the third direction D3 based on the second direction D2. Similarly, the slit 21 formed in the common electrode 20 is shaped like a dogleg.

The slit 21 is located above the pixel electrode 18. In a planar view, the edges corresponding to the four sides of the pixel electrode 18 are located inside the slit 21. In a planar view, the edges of the pixel electrode 18 and the slit 21 are located with a distance L therebetween.

For example, a portion of each signal line SL, which is adjacent to the pixel electrode 18 in the first direction D1, is shaped like a dogleg.

The other configurations are the same as those of the first embodiment.

In the second embodiment, the liquid crystal layer can be formed to have a multi-domain structure. Other advantageous effects are the same as those of the first embodiment.

Like in the modification to the first embodiment, two or more pixel electrodes may be used.

[3] Third Embodiment

The third embodiment is directed to an example of a configuration in which the pixel electrode extends linearly in a direction (second direction D2) that is orthogonal to a scanning line GL.

Figure 19:
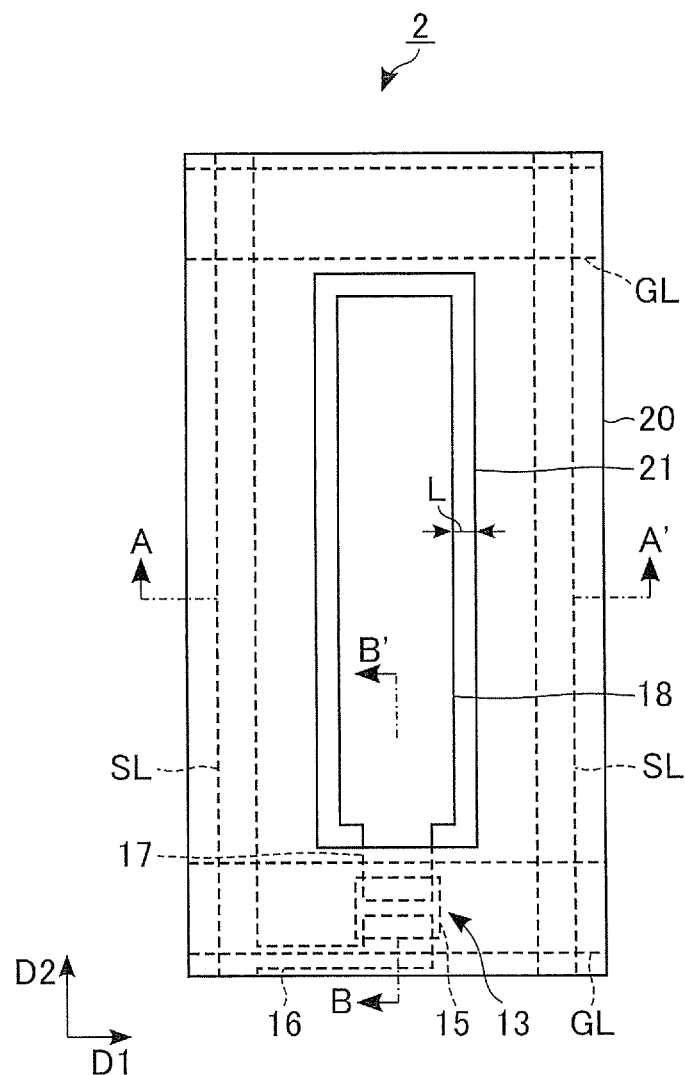
FIG. 19 is a plan view of a liquid crystal display panel according to a third embodiment.
Figure 21:
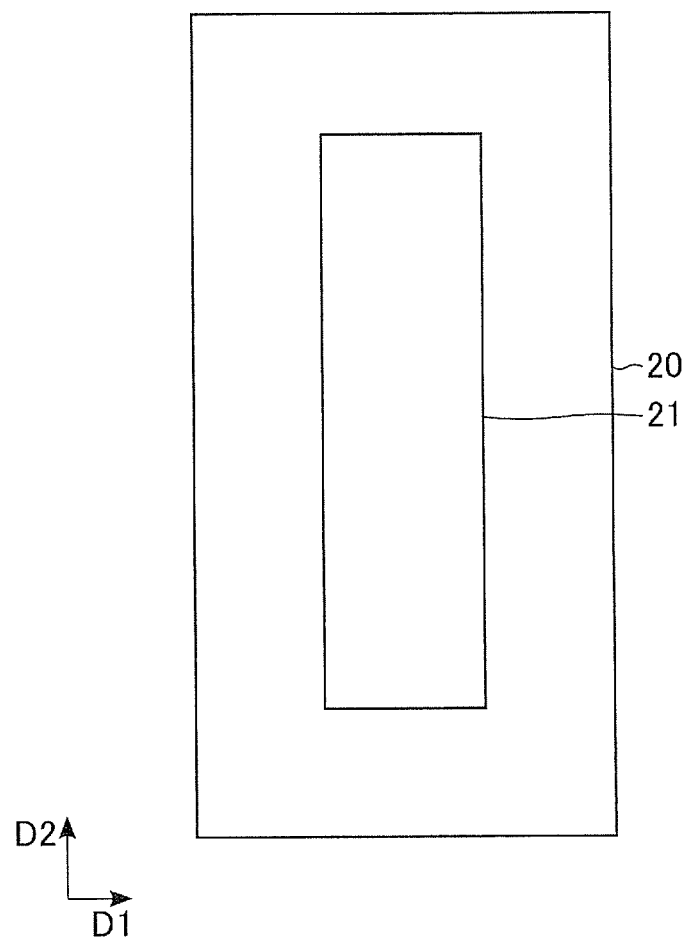
FIG. 21 is a plan view of the common electrode that is extracted.

FIG. 19 is a plan view of a liquid crystal display panel 2 according to the third embodiment. FIG. 20 is a plan view illustrating a configuration of part of the liquid crystal display panel 2 which is below a common electrode 20. FIG. 21 is a plan view of the common electrode 20 that is extracted. The sectional view of the liquid crystal display panel 2 along the line A-A' in FIG. 19 is the same as that in FIG. 5 described in the first embodiment. The sectional view of the liquid crystal display panel 2 along the line B-B' in FIG. 19 is the same as that in FIG. 6 described in the first embodiment.

The pixel electrode 18 extends in the second direction D2. The planar shape of the pixel electrode 18 is rectangular. A slit 21 is formed in the common electrode 20 to extend in the second direction D2. The planar shape of the slit 21 is rectangular.

The slit 21 is located above the pixel electrode 18. In a planar view, the edges corresponding to the four sides of the pixel electrode 18 are located inside the slit 21. In a planar view, the edges of the pixel electrode 18 and the slit 21 are located with a distance L therebetween.

The other configurations are the same as those of the first embodiment. The advantageous effects of the third embodiment are the same as those of the first embodiment.

Like in the modification to the first embodiment, two or more pixel electrodes may be used.

[4] Other Examples

In the foregoing embodiments, in a planar view, the edge of the pixel electrode 18 in the second direction D2 is located inside the slit 21. However, the present invention is not limited to this location. The pixel electrode 18 may overlap the common electrode 20 at its edge in the second direction D2. In other words, the edge of the pixel electrode 18 in the second direction D2 may be formed longer than the slit 21.

In addition, both edges of the pixel electrode 18 in the second direction D2 may be further inclined (for example, 10 to 30 degrees) from the third direction D3. Like the pixel electrode 18, the slit 21 is formed such that both edges thereof are inclined in the second direction D2. It is thus possible to prevent domains having different liquid crystal alignments from being formed at both edges of the pixel electrode 18 in the second direction D2.

In addition, the pixel electrode 18 and the signal line SL may be formed of different level wiring layers. For example, the signal line SL, the insulating film, and the pixel electrode 18 may be stacked in the order presented. In this case, the pixel electrode 18 and the slit 21 may be extended above the scanning line GL.

The present invention is not limited to the foregoing embodiments. When the invention is reduced to practice, a variety of modifications can be made without departing from the spirit of the invention. The embodiments can be combined as appropriate, and advantageous effects can be obtained from the combination. Furthermore, the foregoing embodiments include a variety of inventions, and a variety of inventions can be extracted by selecting and combining a plurality of structural elements. For example, even though some of the structural elements are deleted from the embodiments, a configuration from which the structural elements are deleted can be extracted as an invention if the problem can be solved and an advantageous effect can be obtained.

The invention claimed is:

1. A liquid crystal display device comprising:
   first and second substrates;
   a liquid crystal layer interposed between the first and second substrates;
   a switching element provided on the first substrate;
   a first pixel electrode provided on the first substrate and electrically connected to a drain electrode of the switching element;
   an insulating film provided on the first pixel electrode; and
   a common electrode provided on the insulating film and including a first slit,
   wherein
      the first pixel electrode extends in a first direction,
      the first slit extends in the first direction and is located above the first pixel electrode,
      in a planar view, both edges of the first pixel electrode in a second direction intersecting the first direction are located inside the first slit,
      in a planar view, both edges of the first pixel electrode in the first direction are located inside the first slit, and
      a distance between the first pixel electrode and the first slit in the first direction is same as a distance between the first pixel electrode and the first slit in the second direction.

2. The liquid crystal display device of claim 1, further comprising a second pixel electrode provided on the first substrate, electrically connected to the drain electrode of the switching element, extending in the first direction, and located adjacent to the first pixel electrode in the second direction,
   wherein
      the common electrode further includes a second slit extending in the first direction and located above the second pixel electrode,
      in a planar view, both edges of the second pixel electrode in the second direction are located inside the second slit, and
      in a planar view, both edges of the second pixel electrode in the first direction are located inside the second slit.

3. The liquid crystal display device of claim 1, wherein the liquid crystal layer includes liquid crystal molecules aligned horizontally with respect to a main surface of the first substrate in an initial state.

4. The liquid crystal display device of claim 3, wherein the liquid crystal layer has positive dielectric anisotropy.

5. The liquid crystal display device of claim 1, wherein
   in an off state, a common voltage is applied to the common electrode and the first pixel electrode, and
   in an on state, a common voltage is applied to the common electrode, and a voltage other than the common voltage is applied to the first pixel electrode.

6. The liquid crystal display device of claim 1, wherein the switching element includes:
   a gate electrode provided on the first substrate;
   a gate insulating film provided on the gate electrode;
   a semiconductor layer provided on the gate insulating film; and
   a source electrode and the drain electrode provided on the semiconductor layer and separated from each other.

7. The liquid crystal display device of claim 6, further comprising a signal line extending in the first direction and electrically connected to the source electrode.

8. The liquid crystal display device of claim 1, further comprising a color filter provided on the second substrate.

9. The liquid crystal display device of claim 1, wherein a length of the first pixel electrode in the second direction is longer than a distance between the first pixel electrode and the first slit.

10. The liquid crystal display device of claim 1, wherein in the planar view, the first pixel electrode and the first slit have a dogleg, or parallelogram, planar shape.

* * * * *